US005644949A

United States Patent [19]

Murakami et al.

[11] Patent Number: 5,644,949

[45] Date of Patent: Jul. 8, 1997

[54] COMPRESSOR CAM AND METHOD FOR MANUFACTURING THE SAME

[75] Inventors: Kazuo Murakami; Kazuo Awamura; Shinya Saito, all of Kariya, Japan

[73] Assignee: Kabushiki Kaisha Toyoda Jidoshokki Seisakusho, Kariya, Japan

[21] Appl. No.: 582,540

[22] Filed: Jan. 3, 1996

Related U.S. Application Data

[63] Continuation-in-part of Ser. No. 539,128, Oct. 4, 1995, Pat. No. 5,542,340, and a continuation-in-part of Ser. No. 539, 228, Oct. 4, 1995, which is a continuation-in-part of Ser. No. 538,238, Oct. 3, 1995, which is a continuation-in-part of Ser. No. 475,043, Jun. 7, 1995, Pat. No. 5,601,416, which is a continuation-in-part of Ser. No. 363,609, Dec. 23, 1994, which is a continuation-in-part of Ser. No. 254,970, Jun. 7, 1994, abandoned.

[30] Foreign Application Priority Data

Jan. 9, 1995 [JP] Japan .................................... 7-001299

[51] Int. Cl.[6] ........................... F16H 25/12; F16H 53/00; F01B 3/00

[52] U.S. Cl. .................................... 74/56; 74/567; 92/71; 417/269; 451/62; 451/276; 451/396; 451/460

[58] Field of Search ................................ 74/56, 567, 569; 92/1; 417/269; 451/62, 276, 396, 277, 460

[56] References Cited

U.S. PATENT DOCUMENTS

| | | | |
|---|---|---|---|
| 2,567,576 | 9/1951 | Palumbo | 74/56 |
| 3,830,021 | 8/1974 | Blum et al. | 451/460 X |
| 4,756,239 | 7/1988 | Hattori et al. | 74/56 X |
| 5,542,340 | 8/1996 | Murakami et al. | 74/56 X |

FOREIGN PATENT DOCUMENTS

| | | |
|---|---|---|
| 57-110783 | 7/1982 | Japan . |

*Primary Examiner*—Allan D. Herrmann
*Attorney, Agent, or Firm*—Brooks Haidt Haffner & Delahunty

[57] ABSTRACT

A cam having a front surface and a rear surface to reciprocate a double-headed piston of a compressor twice for every rotation of a drive shaft. A positioner is provided on the front and rear surface of the cam to position the cam on a fixture used for grinding of cam surfaces. The cam surfaces are formed by grinding the front and rear surface of the cam into a convex shape with the cam positioned to the fixture by the positioner. The front cam surface and the rear cam surface have identical shapes and their phases are offset by a predetermined angle with respect to one another. The positioner is arranged at the same position on the front and rear surfaces of the cam with respect to the cam shape.

15 Claims, 8 Drawing Sheets

COMPRESSOR CAM AND METHOD FOR MANUFACTURING THE SAME

This application is a continuation-in-part application of U.S. patent application, Ser. No. 08/539,128, filed on Oct. 4, 1995, now U.S. Pat. No. 5,542,340, and of copending U.S. patent application, Ser. No. 08/539,228, filed on Oct. 4, 1995, which is a continuation-in-part application of copending U.S. patent application, Ser. No. 08/538,238, filed on Oct. 3, 1995, which is a continuation-in-part application of U.S. patent application, Ser. No. 08/475,043, filed on Jun. 7, 1995, now U.S. Pat. No. 5,601,416 which is a continuation-in-part application of copending U.S. patent application, Ser. No. 08/363,609, filed on Dec. 23, 1994, which is a continuation-in-part application of U.S. patent application, Ser. No. 08/254,970, filed on Jun. 7, 1994, now abandoned in favor of continuation application, Ser. No. 08/645,929, filed on May 14, 1996.

BACKGROUND OF THE INVENTION

1. Field of the Invention

The present invention relates generally to a compressor which reciprocates pistons by rotating a wave cam provided integrally with a drive shaft. More particularly, it pertains to a wave cam and its manufacturing method.

2. Description of the Related Art

In compressors that reciprocate pistons by rotating a swash plate, each piston is reciprocated once for every rotation of the plate. Hence, it is necessary to enlarge the size of the compressor to increase the compressing displacement per rotation of the swash plate.

To cope with this problem, a wave cam compressor has been recently proposed. This compressor employs a three-dimensional, convex, wave-shaped cam in lieu of the swash plate.

A wave cam type compressor, such as the type disclosed in Japanese Unexamined Patent Publication 57-110783 displaces double-headed pistons by way of rollers. This reciprocates the double-head pistons according to a displacement curve defined by the surface of the wave cam.

However, the wave cam disclosed in the above publication employs a cam surface having continuous concave and convex surfaces. Grinding conditions differ between the concave and convex surfaces. This not only results in troublesome machining but also lowers accuracy, especially at the boundary portions between the concave and convex surfaces. Thus, this may lead to the cam surface having inconsistent surface roughness and dimensions. Dimensional inaccuracy at these boundaries may have effects on the movement of the pistons and cause a decrease in the efficiency of the compressor.

SUMMARY OF THE INVENTION

Accordingly, it is a primary objective of the present invention to provide a wave cam and manufacturing method that improves the accuracy of the cam surface while also enabling efficient machining.

To achieve the foregoing objective, a compressor cam according to the present invention has front and rear cam surfaces. The cam includes a positioner formed on the cam for positioning the cam with respect to a jig used for grinding the cam surfaces. The cam surface is adapted to be formed by grinding the front and rear surfaces into a convex shape while being positioned on the jig with the positioner. The front cam surface and the rear cam surface each have an identical shape. The phases of the front and rear cam surfaces are offset by a predetermined angle with respect to one another. The positioner is located at a position that is the same with respect to the shape of the front surface as it is with respect to the shape of the rear surface.

To produce the above cam, a jig which has a support shaft and a positioning piece is prepared. A primary product having front and rear sides, a shaft hole, and a positioner is molded. The shaft hole is commonly used for receiving the drive shaft and the support shaft. The positioner is commonly used for engaging the positioning piece to form front and rear cam surfaces on the front and rear sides of the primary product, respectively. The primary product is mounted on the jig by inserting the support shaft into the support hole and by engaging the positioning piece with the positioner to place one of the sides in a position to face a grinder. One cam surface in a convex shape is formed by grinding the facing side of the primary product with the grinder. The mounting step is repeated after reversing the primary product so that the other side faces the grinder. The other cam surface is formed in a convex shape by grinding the facing side with the grinder.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a wave cam type compressor according to the present invention will hereafter be described with reference to FIGS. 1 through 8.

Figure 1:
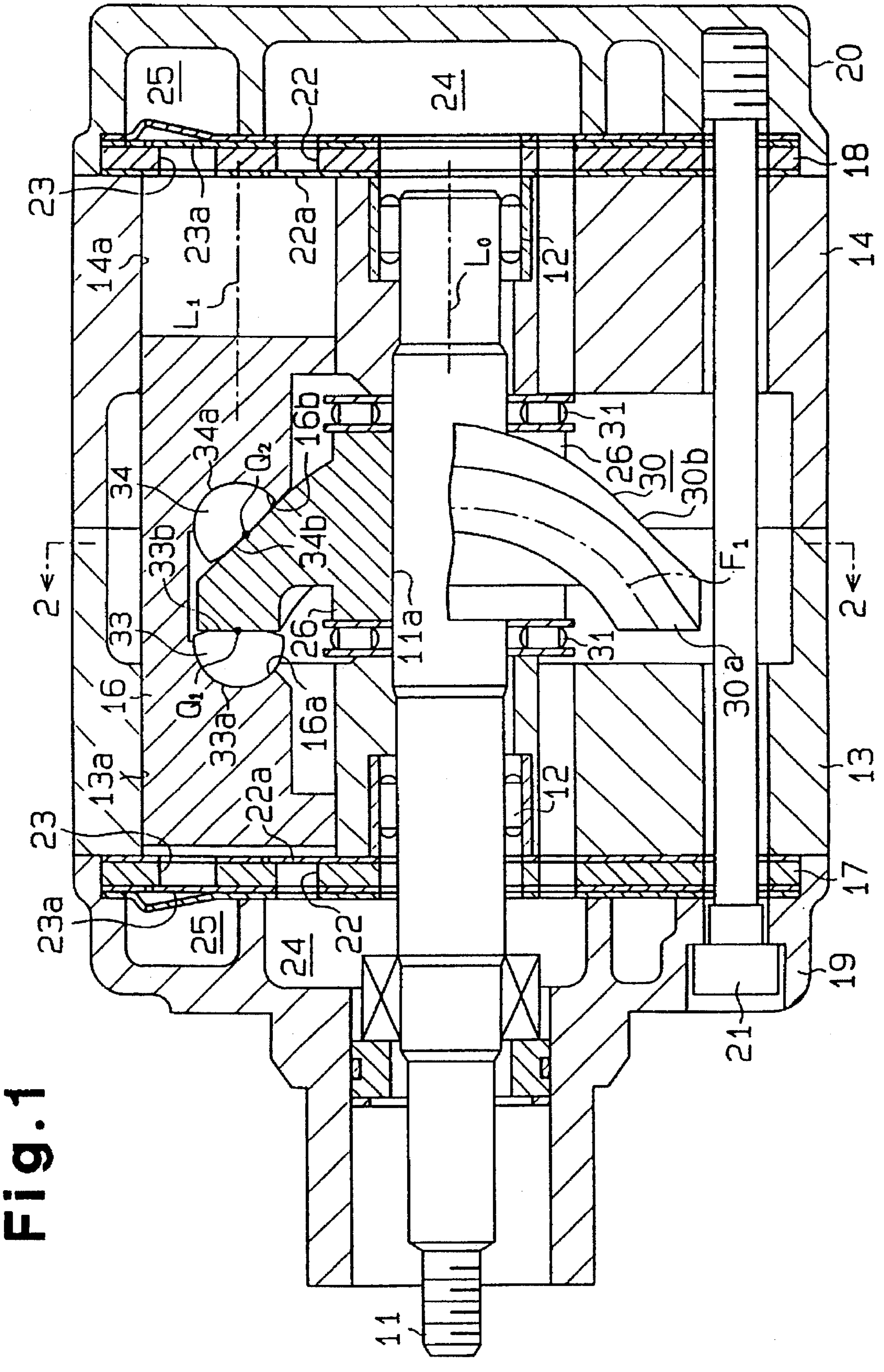
FIG. 1 is a cross-sectional side elevation view showing a wave cam type compressor according to a first embodiment of the present invention.
Figure 2:
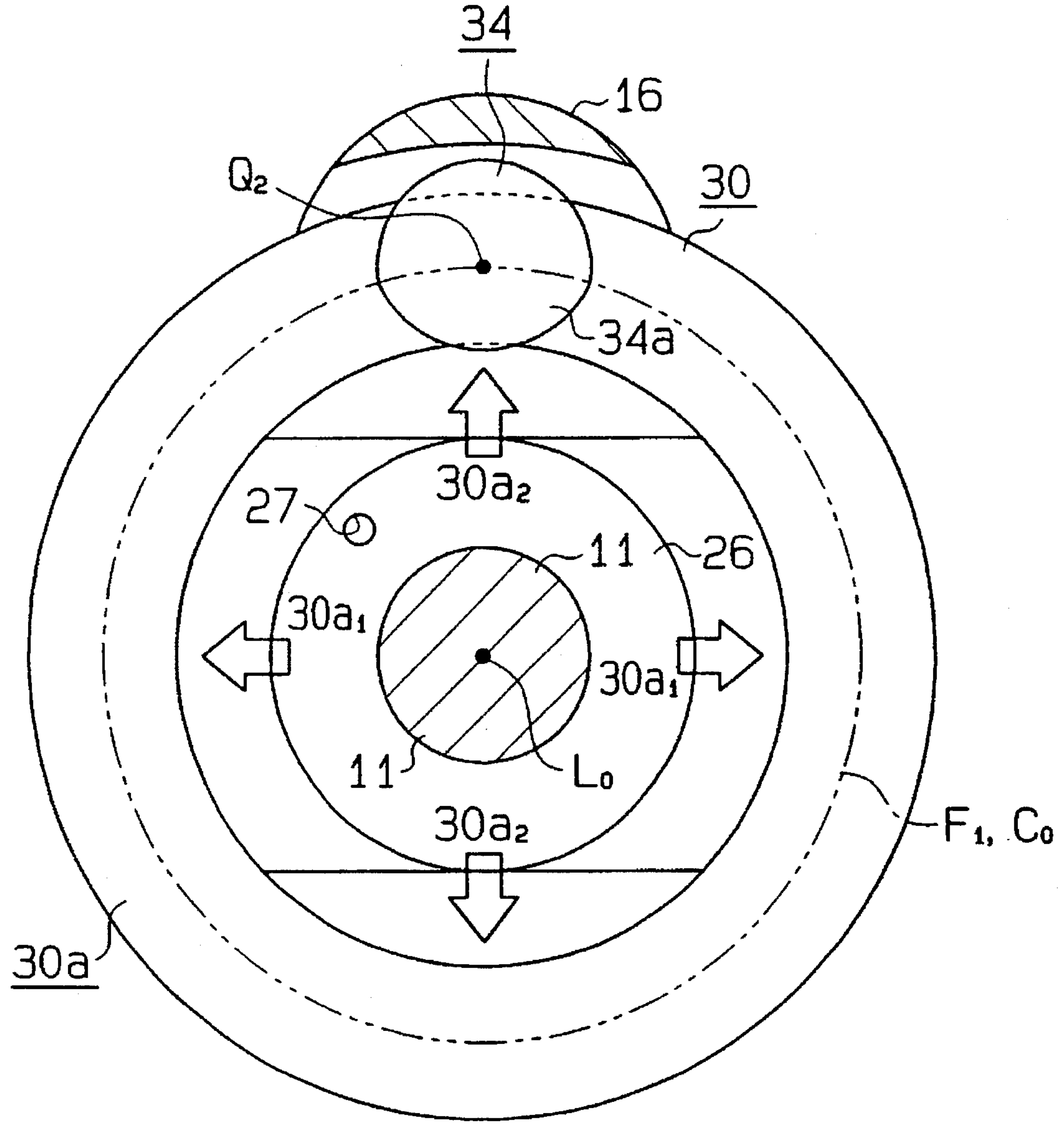
FIG. 2 is a cross-sectional view of FIG. 1 taken along line 2—2.

As shown in FIGS. 1 and 2, a drive shaft 11 is rotatably supported in a front and rear cylinder block 13, 14 by bearings 12. Pairs of longitudinally aligned cylinder bores 13*a*, 14*a* are formed in the two cylinder blocks 13, 14. The cylinder bores 13*a*, 14*a* are arranged about the shaft 11 at equal angular intervals. A double-headed piston 16 is reciprocally accommodated in each pair of cylinder bores 13*a*, 14*a*. The piston 16 is provided with a piston head on each end. A front housing 19 and a rear housing 20 are securely fastened by bolts 21 to a front end of the cylinder block 13 and a rear end of the cylinder block 14 with valve plates 17, 18 provided between the blocks 13, 14 and the housings 19, 20, respectively. Suction chambers 24 and discharge chambers 25 are defined between the valve plates 17, 18 and the associated housings 19, 20. The chambers 24, 25 are respectively communicated with each cylinder bore 13*a*, 14*a* via suction ports 22 and discharge ports 23, which are formed in the valve plates 17, 18. Suction valves 22*a* and discharge valves 23*a*, which are reed valves, are provided on the valve plates 17, 18.

A wave cam 30 fixed to the drive shaft 11 rotates integrally with the shaft 11. The wave cam has a front cam surface 30*a* and a rear cam surface 30*b*. Thrust bearings 31 are provided between a boss 26 of the wave cam 30 and the cylinder blocks 13, 14. Shoes 33, 34 are located between the wave cam 30 and each piston 16. Each shoe 33, 34 has a spherical surface 33*a*, 34*a* and a flat surface 33*b*, 34*b*. The spherical surfaces 33*a*, 34*a* are slidably received in associated recesses 16*a*, 16*b*, which are formed in the piston 16. The flat surfaces 33*b*, 34*b* slide on the associated front and rear cam surfaces 30*b*, 30*a*.

Figure 3:
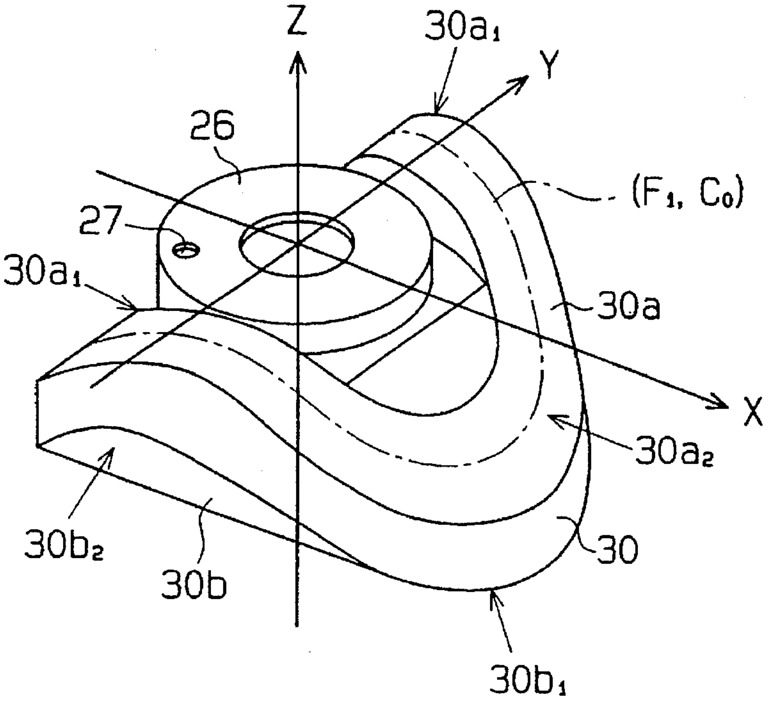
FIG. 3 is a perspective view showing a wave cam.

As shown in FIGS. 2 and 3, a two-cycle undulated displacement curve F1 is defined on each surface 30*a*, 30*b* of the wave cam 30. Each curve F1 has a center which coincides with the axis L0 of the drive shaft 11 and is defined along a cylinder surface C0. The radius of the cylinder surface C0 is defined by the distance from the axes L1 of the cylinder bores 13*a*, 14*a* to the axis L0. The curves F1 of the cam surfaces 30*a*, 30*b* each include a pair of maximum lift sections $\mathbf{30}a_1$, $\mathbf{30}b_1$ and a pair of minimum lift sections $\mathbf{30}a_2$, $\mathbf{30}b_2$. Centers Q1, Q2 of the spherical surfaces 33*a*, 34*a* coincide with the centers of the flat surfaces 33*b*, 34*b*, respectively. This allows the centers Q1, Q2 to constantly slide along the associated curves F1. Accordingly, the displacement of the pistons 16 during reciprocation caused by rotation of the wave cam 30 depends on the shape of the displacement curve F1.

During rotation of the wave cam 30, the front head of each piston 16 is disposed at the top dead center while the rear head is disposed at the bottom dead center when one of the maximum lift sections $\mathbf{30}a_1$ of the front cam surface 30*a* is engaged with the shoe 33 and one of the minimum lift sections $\mathbf{30}b_2$ of the cam surface 30*b* is simultaneously engaged with the shoe 34. Contrarily, the front head of each piston 16 is disposed at the bottom dead center while the rear head is disposed at the top dead center when the minimum lift section $\mathbf{30}a_2$ of the front cam surface 30*a* is engaged with the shoe 33 and the maximum lift section $\mathbf{30}b_1$ of the cam surface 30*b* is simultaneously engaged with the shoe 34.

Figure 4:
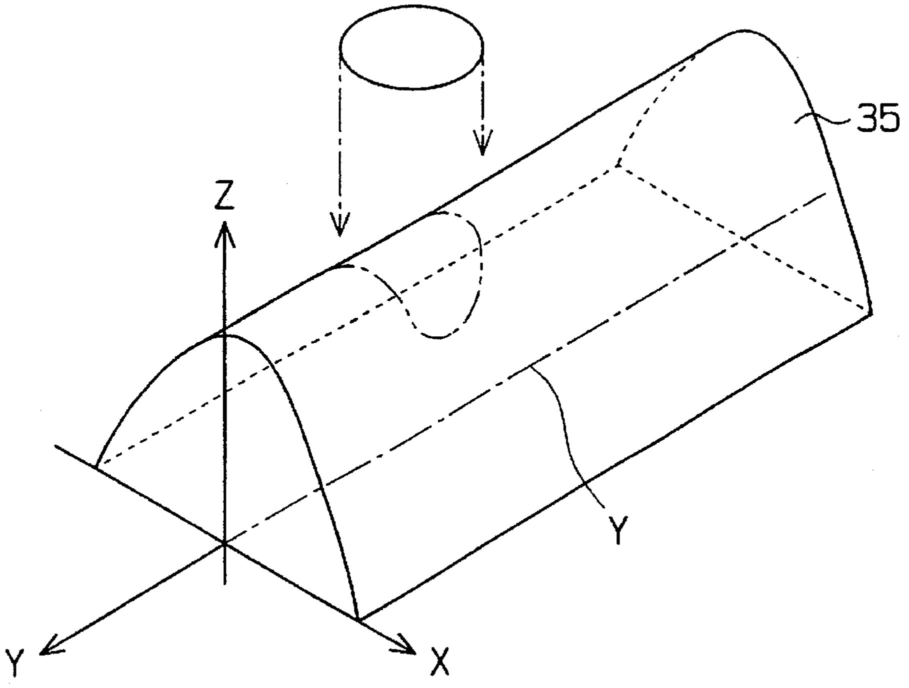
FIG. 4 is a perspective view diagrammatically showing the derivation of the shape of the wave cam.

The front and rear cam surfaces 30*a*, 30*b* of the wave cam 30 are each defined by a convex surface 35 (FIG. 4). The convex surface 35, which corresponds to surface 30*a* in FIG. 3, is formed by moving a parabola, which lies in the X–Z plane, along the Y axis. Similarly, referring to FIG. 3, surface 30*b* is defined by moving the same parabola, which now lies in the Y–Z plane, along the X-axis. The cam 30 is further defined by the intersection of the convex surface 35 with a cylinder, the center axis of which is parallel to the Z axis as shown in FIG. 4. The width of each cam surface 30*a*, 30*b* is defined between the cam's outer periphery and the contour of a circle, the diameter of which is both smaller than and concentric to the cam's periphery. Accordingly, the highest portion of each parabola corresponds to the pair of maximum lift sections $\mathbf{30}a_1$, $\mathbf{30}b_1$ while the lowest portion of each parabola corresponds to the minimum lift sections $\mathbf{30}a_2$, $\mathbf{30}b_2$ on each cam surface 30*a*, 30*b*.

An angular interval of 180 degrees is provided between each minimum lift section $\mathbf{30}a_2$ of the front cam surface 30*a*, each minimum lift section $\mathbf{30}b_2$ of the rear cam surface 30*b*, each maximum lift section $\mathbf{30}a_1$ of the front cam surface 30*a*, and each maximum lift section $\mathbf{30}b_1$ of the rear cam surface 30*b*. An angular interval of 90 degrees is provided between the maximum lift sections $\mathbf{30}a_1$ and the minimum lift sections $\mathbf{30}a_2$ on the front cam surface 30*a*, and between the maximum lift sections $\mathbf{30}b_1$ and the minimum lift sections $\mathbf{30}b_2$ on the rear cam surface 30*b*. The rear cam surface 30*b* is arranged by offsetting the phase of the front cam surface 30*a* by 90 degrees. Accordingly, each minimum lift section $\mathbf{30}a_2$ of the front cam surface 30*a* is arranged back to back with each maximum lift section $\mathbf{30}b_1$ of the rear cam surface 30*b*, and each maximum lift section $\mathbf{30}a_1$ of the front cam surface 30*a* is arranged back to back with each minimum lift section $\mathbf{30}b_2$ of the rear cam surface 30*b*. The front and rear cam surfaces 30*a*, 30*b* are both convex.

Figure 5A:
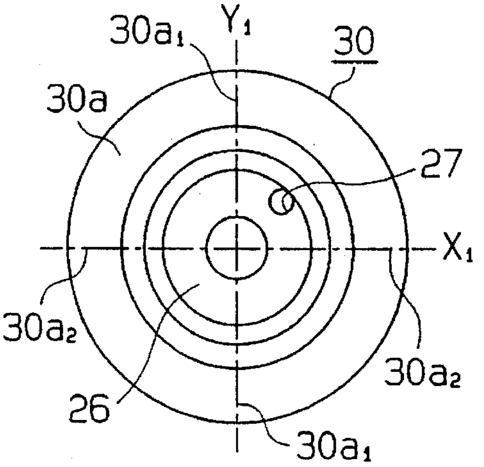
FIG. 5(*a*) is front view of the wave cam shown in FIG. 1, FIG. 5(*b*) is a rear view of the wave cam.
Figure 5B:
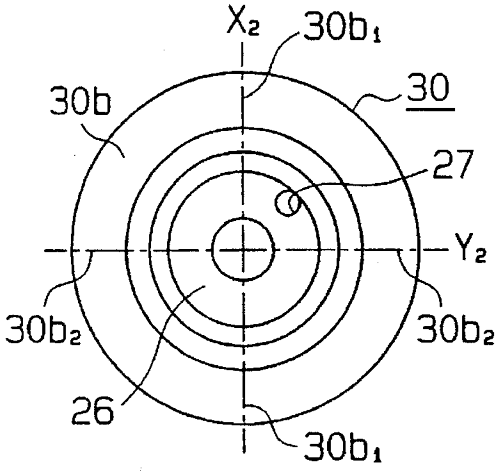

As shown in FIG. 5, a through hole 27, serving as a positioner, is defined on a line bisecting the angle between a line segment $Y_1$, which connects the two maximum lift sections $\mathbf{30}a_1$ of the cam surface 30*a*, and a line segment $X_1$, which connects the two minimum lift sections 30*a*2. Accordingly, the through hole 27 is separated from both maximum lift sections $\mathbf{30}a_1$ and $\mathbf{30}b_1$ by an angular interval of 45 degrees as shown in FIGS. 5(*a*) and (*b*).

As described above, the minimum lift sections $\mathbf{30}a_2$ of the front cam surface 30*a* and the maximum lift sections $\mathbf{30}b_1$ of the rear cam surface 30*b* are arranged back to back. The maximum lift sections $\mathbf{30}a_1$ of the front cam surface 30*a* and the minimum lift sections $\mathbf{30}b_2$ of the rear cam surface 30*b* are also arranged back to back. As a result, the line segment $Y_1$, which connects the two maximum lift sections $\mathbf{30}a_1$ of the cam surface 30*a*, a line segment $Y_2$, which connects the two minimum lift sections $\mathbf{30}b_2$ of the cam surface 30*b*, and the center axis of the cam 30 all lie in the same plane. In the same manner, the line segment $X_1$, which connects the two minimum lift sections $\mathbf{30}a_2$ of the cam surface 30*a*, a line segment $X_2$, which connects the two maximum lift sections $\mathbf{30}b_1$ of the cam surface 30*b*, and the center axis of the cam 30 all lie in the same plane. In addition, since the maximum lift sections $\mathbf{30}a_1$, $\mathbf{30}b_1$ are separated from the minimum lift sections $\mathbf{30}a_2$, $\mathbf{30}b_2$ by an angular interval of 90 degrees, the above two planes are perpendicular to each other. Accordingly, the bisector of the angle between the line segments $X_1$, $Y_1$ and the bisector of the angle between the line segments $X_2$, $Y_2$ lie upon the same plane, which includes the center axis of the wave cam 30. Hence, the through hole 27 defined on the bisectors is defined at the same position on both cam surfaces 30*a*, 30*b* with respect to the maximum lift sections 30*a*1, $\mathbf{30}b_1$ and the minimum lift sections $\mathbf{30}a_2$, $\mathbf{30}b_2$.

When the drive shaft 11 and the wave cam 30 are integrally rotated, the motion of the wave cam 30 reciprocates each piston 16 inside its associated cylinder bore 13*a*, 14*a* by way of the shoes 33, 34. As one of the heads of the piston 16 is moved from its top dead center position to its bottom dead center position in the associated cylinder bore 13*a*, 14*a*, refrigerant gas is drawn into the bore 13*a*, 14*a* from the suction chamber 24 through the suction ports 22. The head of the piston 16 is then moved from its bottom dead center position to its top dead center position. This compresses the gas in the cylinder bores 13*a*, 14*a* and discharges the compressed gas into the discharge chambers 25 through the discharge ports 23.

The manufacturing method of the wave cam 30 will now be described. A primary product, or preform, of the wave cam 30 is obtained through molding such as die casting. The surface of the preform 30 is then deburred and holes and the like are machined. Finally, the surface of the preform 30 is ground to obtain the cam surfaces 30*a*, 30*b*. The wave cam and the preform will be denoted with the same numeral to avoid confusion.

Figure 6:
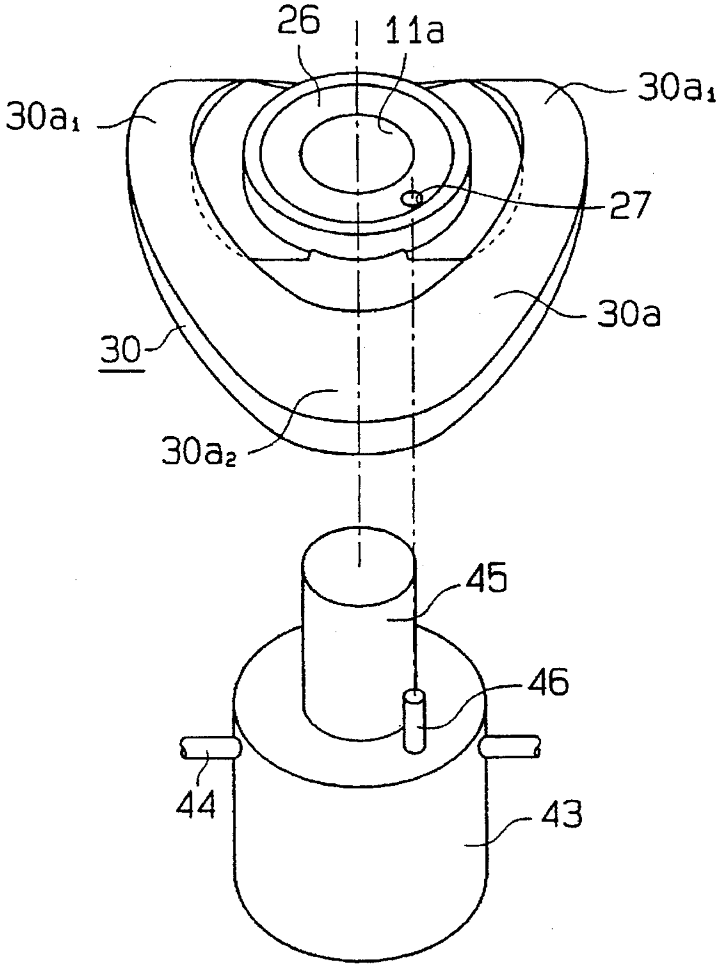
FIG. 6 is an explanatory perspective view showing a grinding fixture for the wave cam shown in FIG. 5.

As shown in FIG. 6, the preform 30 is mounted on a jig, or fixture 43, and positioned thereon by inserting a positioning piece or pin 46 and a support shaft 45 of the fixture 43 into the through hole 27 and shaft hole 11*a* of the wave cam 30, respectively. Accordingly, the positioning pin 46 prevents the preform 30 from rotating relative to the fixture 43. The fixture 43 is mounted on a table (not shown) of a numerically controlled (NC) milling machine. The fixture 43 tilts about a swing shaft 44 in both clockwise and counterclockwise directions from the positions shown in FIGS. 7 and 8. The positioning pin 46 is arranged at a position separated 45 degrees from the swing shaft 44. In other words, referring to FIG. 6, if the swing shaft 44 occupies the three o'clock and nine o'clock positions, then the pin 46 occupies a position halfway between 4 and 5 o'clock.

Figure 7:
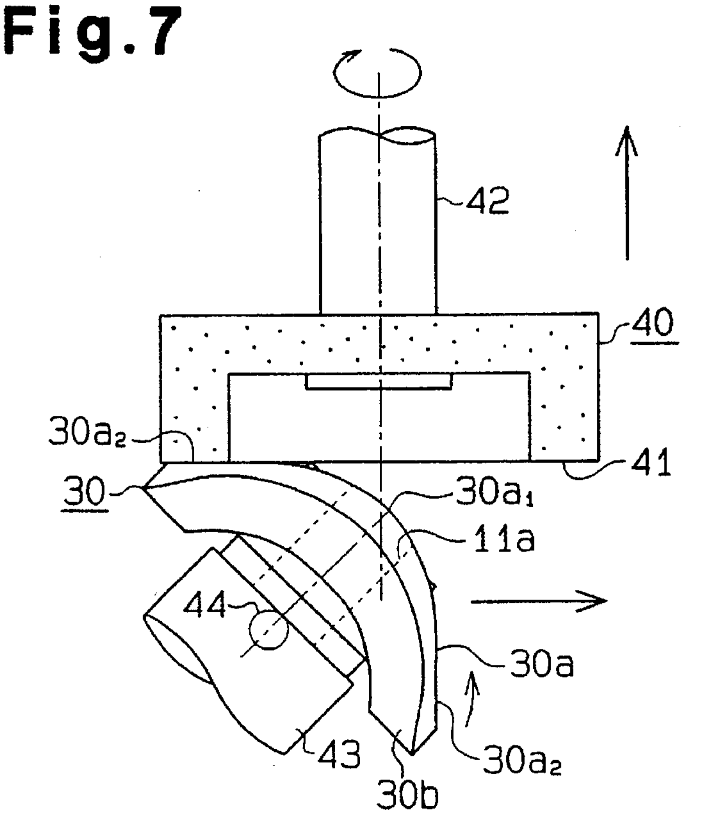
FIG. 7 is an explanatory drawing showing the cam surface being ground.
Figure 8:
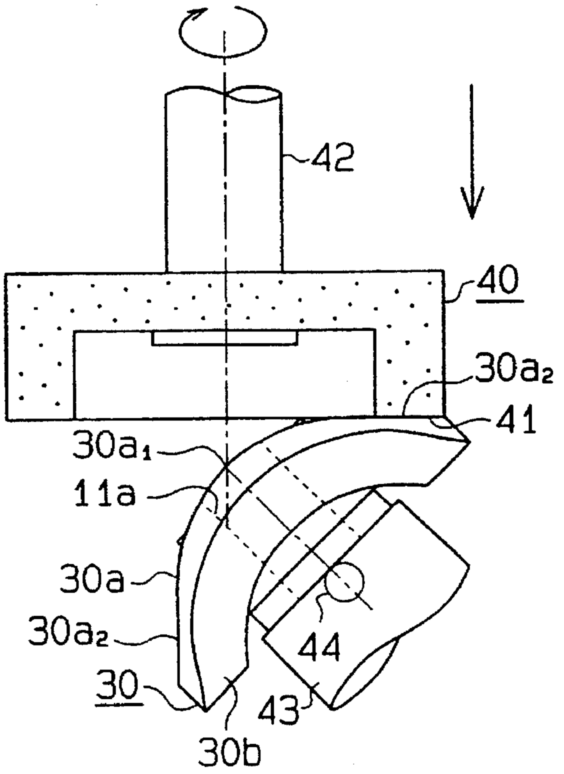
FIG. 8 is an explanatory drawing showing the cam surface being ground.

As shown in FIG. 7, a grinder 40 used to grind the preform 30 has a cup shape, an outer diameter larger than that of the wave cam 30, and a grinding face 41 at its end face. A shaft 42 coupled to the grinder 40 is attached to the spindle (not shown) of the NC milling machine. The motion of the spindle rotates, raises, and lowers the grinder 40.

To grind the front cam surface 30*a*, the grinding face 41 is first positioned opposite to the front side of the preform 30, or the front cam surface 30*a*. The spindle then commences rotation and is lowered integrally with the grinder 40 to bring the grinding face 41 into contact with the cam surface 30*a*. The tilting angle of the fixture 43 is adjusted to allow contact between one of the minimum lift sections $30a_2$ and the grinding face 41. After contact, the grinder 40 is further lowered for a predetermined depth of the cam surface 30*a* (refer to FIG. 7). From this state, the grinder 40 is gradually raised while the fixture 43 is tilted in the counterclockwise direction of the drawing and simultaneously moved horizontally toward the right of the drawing. This grinds a predetermined depth of the surface of the preform 30.

When the maximum lift sections $30a_1$ reach the grinder 40, the grinder 40 is gradually lowered again. After the remaining minimum lift section $30a_2$ of the cam surface 30*a* reaches the grinder 40, the grinder 40 is raised and separated from the cam surface 30*a*. This ends the grinding operation of the front cam surface 30*a*.

To grind the rear cam surface 30*b*, the preform 30 is taken off the fixture 43 and reversed. The preform is then remounted on the fixture 43 and positioned thereon by inserting the positioning pin 46 into the through hole 27 and by inserting the boss 45 into the shaft hole 11*a*. This allows the rear side of the preform 30 to be opposed to the grinder 40 and allows the cam surface 30*b* to be ground. The cam surface 30*b* is then ground in the same manner as the front cam surface 30*a*.

The sequential movements necessary for grinding, such as the lowering and raising of the grinder 40 and the tilting of the fixture 43, are automatically controlled by a program stored into a computer beforehand.

As described above, the cam surfaces 30*a*, 30*b* of the wave cam 30 in the present embodiment are convex. This allows the grinding condition of the cam surfaces 30*a*, 30*b* to be continuous, whereas a wave cam which has both convex and concave surfaces necessitates alteration of grinding conditions between different surfaces. Therefore, it is possible to obtain a wave cam having high dimensional accuracy due to the improved efficiency in grinding.

The through hole 27 which serves as a positioning section, or a positioner, is provided at the same position on the front and rear cam surfaces 30*a*, 30*b*. Accordingly, it is possible to mount the wave cam 30 on the fixture 43 in a manner such that the position relationship between the fixture 43 and both cam surfaces 30*a*, 30*b* is always the same. Additionally, when reversing the sides of the preform 30, it is not necessary to move the positioning pin 46 of the fixture 43 or rotate the fixture 43 itself to position the wave cam 30. This reduces unnecessary procedures and prevents misalignment between the front and rear cam surfaces 30*a*, 30*b*. It also allows the two cam surfaces 30*a*, 30 to accurately undergo the same machining.

Furthermore, the grinding of the cam surfaces 30*a*, 30*b* is performed by the grinding face 41 of the grinder 40 arranged at a position where it is opposed to the grinding face 41 of the grinder 40. Accordingly, the pressure produced during grinding acts perpendicular to the cam surfaces 30*a*, 30*b*. Hence, the pressure acts efficiently on the cam surfaces 30*a*, 30*b*. This allows efficient grinding of the cam surfaces 30*a*, 30*b* while maintaining high grinding precision.

Other embodiments of the present invention will be described with the description centered on the points differing from the first embodiment.

Figure 9A:
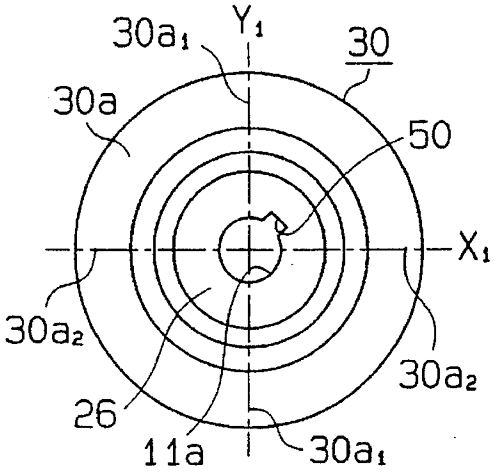
FIG. 9(*a*) is a front view of a cam surface of a wave cam according/to a second embodiment, FIG. 9(*b*) is a rear view of the wave cam.
Figure 9B:
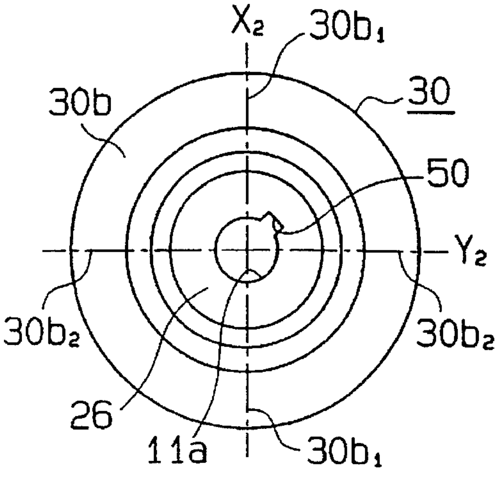
Figure 10:
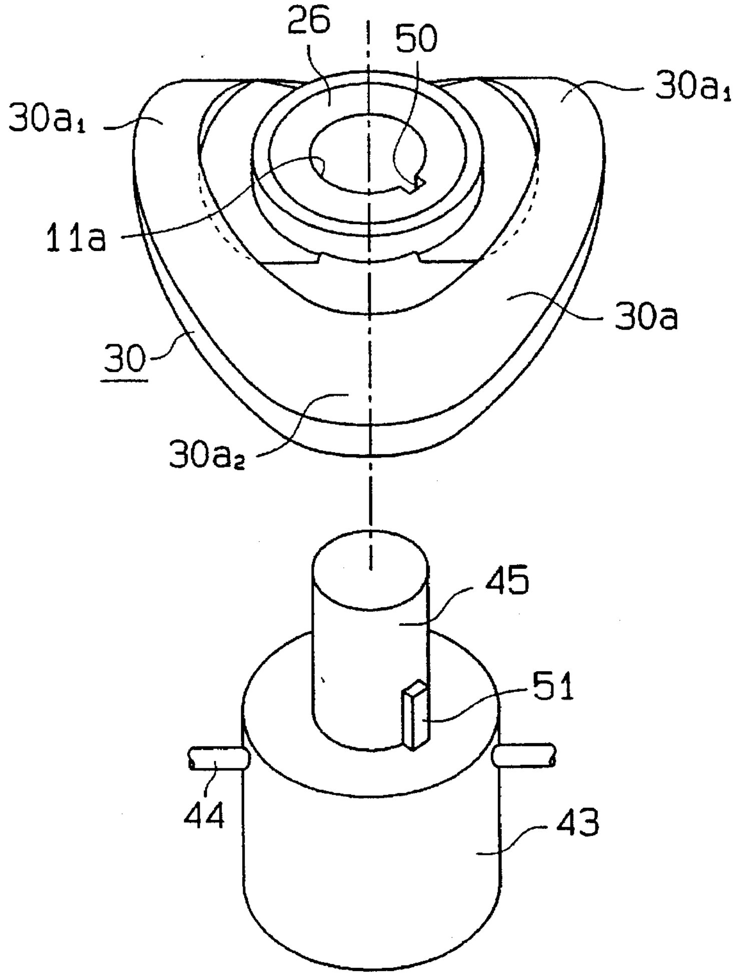
FIG. 10 is an explanatory perspective view showing a grinding fixture of the wave cam shown in FIG. 9.

In a second embodiment, as shown in FIGS. 9 and 10, a keyway 50 which serves as a positioner during grinding is formed in the wave cam 30. The keyway 50 extends through the wave cam 30 and has a substantially U-shaped cross-section. As shown in FIG. 9(*a*), the keyway 50 is opened to the shaft hole 11*a* and is defined at the periphery of the hole 11*a* on a bisector of the angle between the line segment $Y_1$, which connects the two maximum lift sections $30a_1$, and a line segment $X_1$, which connects the two minimum lift sections 30*a*2. Accordingly, the keyway 50 is arranged at the same position on both cam surfaces 30*a*, 30*b*.

In the second embodiment, the support shaft 45 of the fixture 43 is inserted into the shaft hole 11*a* while a positioning piece or key is fitted into the keyway 50 to position the preform 30 on the fixture 43.

This structure will also enable the wave cam 30 to be mounted on the fixture 43 with the same position relationship between the fixture 43 and either side of the wave cam 30. In addition, the keyway 50 may also be employed for engagement with a key which fastens the wave cam 30 to the drive shaft 11.

Figure 11:
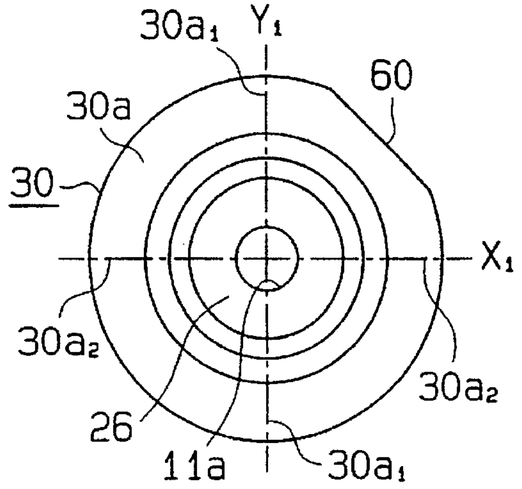
FIG. 11(*a*) is a front view of a cam surface of a wave cam according to a third embodiment, FIG. 11(*b*) is a rear view of the wave cam.
Figure 11:
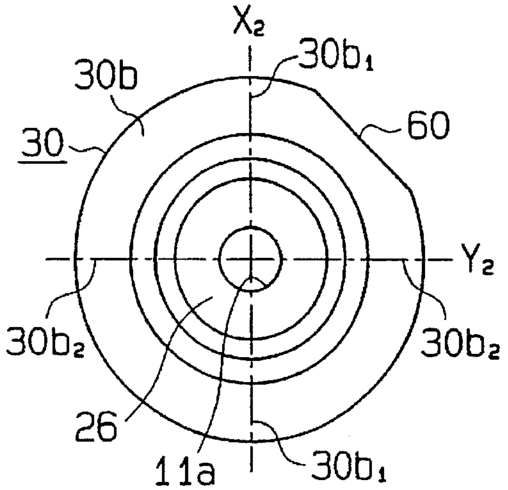
Figure 12:
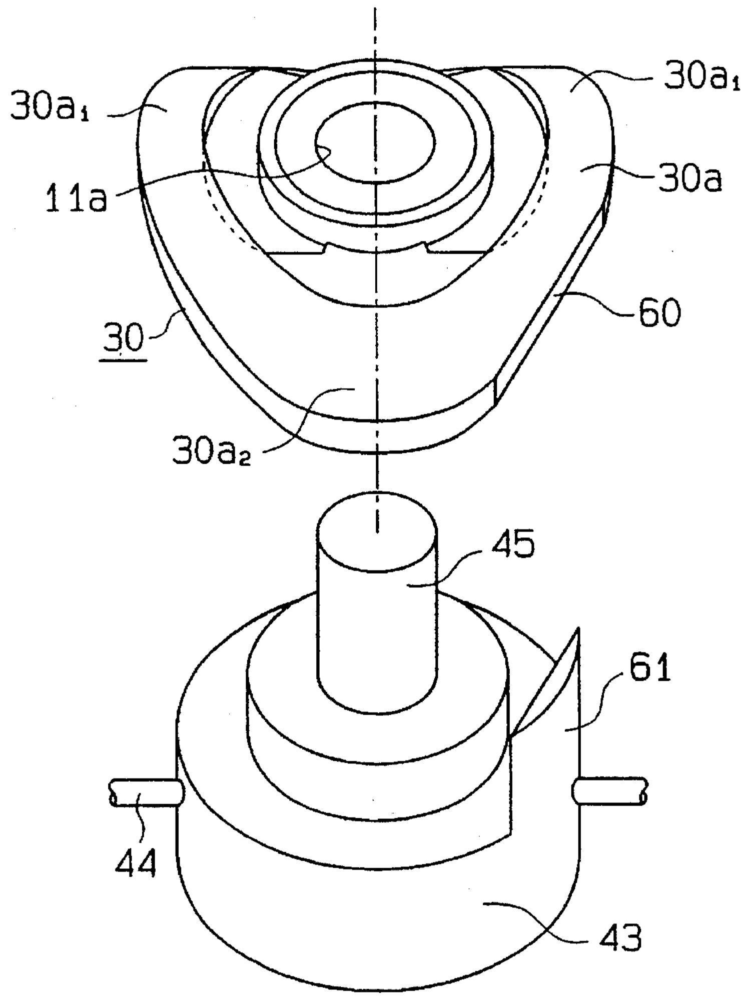
FIG. 12 is an explanatory perspective view showing a grinding fixture of the wave cam shown in FIG. 11.

In a third embodiment shown in FIGS. 11 and 12, a flat 60, which serves as a positioner, is provided on the edge of the wave cam 30. As shown in FIG. 11(*a*), the flat 60 is arranged to be perpendicular to a bisector of the angle between line segment $Y_1$, which connects the two maximum lift sections $30a_1$, and the line segment $X_1$, which connects the two minimum lift sections $30a_2$. Accordingly, the flat 60 is arranged at the same position on both cam surfaces 30*a*, 30*b*.

In the third embodiment, the support shaft 45 of the fixture 43 is inserted into the shaft hole 11*a* while a positioning piece or projection 61 on the fixture 43 is abutted against the flat 60 to position the wave cam 30 on the fixture 43.

With this structure, the machining of the flat 60 is facilitated since the flat 60 is provided on the edge of the cam surfaces 30*a*, 30*b*. Furthermore, the function of the cam 30 are not effected by the flat 60 since the flat 60 is small.

Figure 13A:
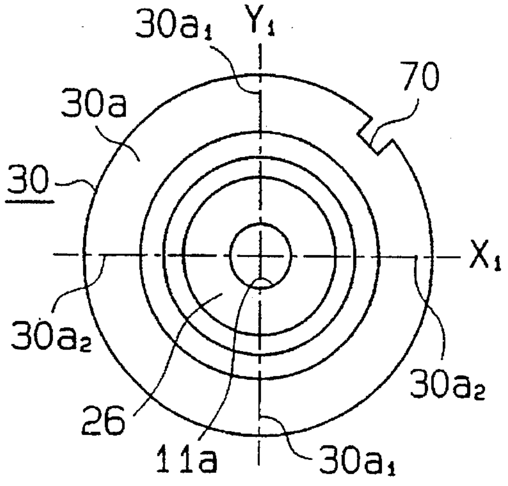
FIG. 13(*a*) is a front view of a wave cam according to a fourth embodiment, FIG. 13(*b*) is a rear view of the wave cam.
Figure 13B:
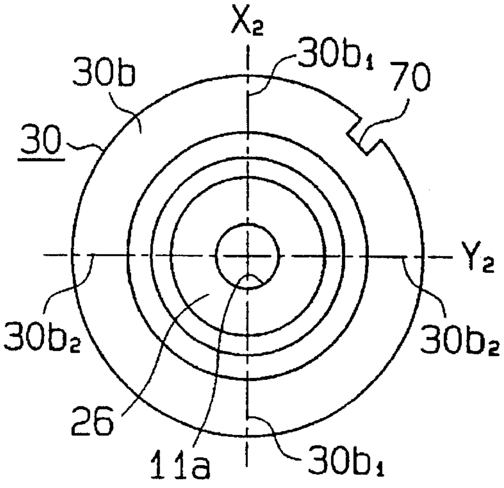
Figure 14:
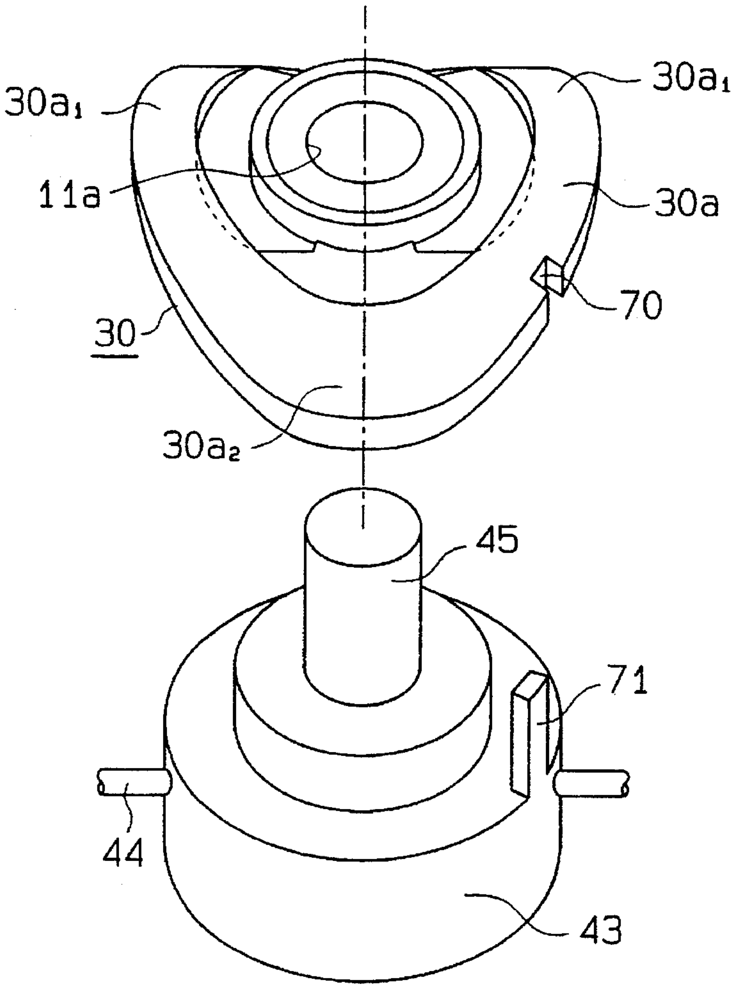
FIG. 14 is an explanatory perspective view showing the grinding fixture of the wave cam shown in FIG. 13.

In a fourth embodiment, as shown in FIGS. 13 and 14, a keyway 70, which serves as a positioner during grinding is formed in the edge of the wave cam 30. The keyway 70 has a substantially U-shaped cross-section. As shown in FIG. 13(*a*), the keyway 70 is provided on a bisector of the angle between line segment $Y_1$, which connects the two maximum lift sections 30*a*$_1$, and a line segment $X_1$, which connects the two minimum lift sections 30*a2*. Accordingly, the keyway 70 is arranged at the same position on both cam surfaces 30*a*, 30*b*.

In the fourth embodiment, the support shaft 45 of the fixture 43 is inserted into the shaft hole 11*a* while a positioning piece or key 71 on the fixture 43 is fit into the keyway 70 to position the wave cam 30 on the fixture 43.

Although only four embodiments of the present invention has been described herein, it should be apparent to those skilled in the art that the present invention may be embodied in many other specific forms without departing from the spirit or scope of the invention.

Particularly, it should be understood that the present invention may be modified in the forms described below.

(1) The cam surfaces 30*a*, 30*b* of the wave cam 30 may have convex surfaces defined by a curve other than a parabola such as an ellipse.

(2) In the second embodiment, the cross-sectional shape of the keyway 50 may be altered to a triangular shape.

(3) In the fourth embodiment, a V-shaped keyway may be formed instead of the U-shaped keyway.

(4) The grinding of the cam surfaces 30*a*, 30*b* may be performed by employing a rod-shaped grinder, which rotates about an axis perpendicular to the axis of the shaft hole 11*a*.

Therefore, the present example and embodiments are to be considered as illustrative and not restrictive and the invention is not to be limited to the details given herein, but may be modified within the scope of the appended claims.

What is claimed is:

1. A compressor cam having front and rear cam surfaces, said cam comprising:

a positioner formed on the cam for positioning the cam with respect to a jig used for grinding the cam surfaces;

wherein said cam surface is adapted to be formed by grinding the front and rear surfaces into a convex shape while being positioned on the jig with the positioner, the front cam surface and the rear cam surface each having an identical shape, the phases of which are offset by a predetermined angle with respect to one another, and wherein said positioner is located at a position that is the same with respect to the shape of the front surface as it is with respect to the shape of the rear surface.

2. The cam according to claim 1, wherein each cam surface includes:

a pair of maximum lift sections for positioning an associated piston head at its top dead center position, said maximum lift sections being separated from each other by 180 degrees; and a pair of minimum lift sections for positioning an associated piston head at its bottom dead center position, said minimum lift sections being separated from each other by 180 degrees.

3. The cam according to claim 1, wherein the predetermined angle is 90 degrees.

4. The cam according to claim 3, wherein said positioner is located halfway between one of the maximum lift sections and one of the minimum lift sections of the front cam surface, and halfway between one of the maximum lift sections and one of the minimum lift sections of the rear cam surface.

5. The cam according to claim 4, wherein said cam has a shaft hole at the center thereof into which the drive shaft is inserted and has an axially protruding boss around the shaft hole.

6. The cam according to claim 5, wherein said positioner includes a hole formed through the boss and located apart from the shaft hole.

7. The cam according to claim 5, wherein said positioner includes a keyway formed in the shaft hole.

8. The cam according to claim 5, wherein said positioner includes a keyway formed in the outer edge of the cam.

9. A compressor having a drive shaft, a cylinder bore, a double-headed piston for reciprocating within the cylinder bore, a cam having front and rear surfaces, each surface being adapted to drive the double-headed piston through four complete strokes per single cam revolution, and shoes for sliding on the cam surfaces to convert the rotation of the cam to the reciprocating movement of the piston, said cam comprising:

a positioner formed at each surface of the cam for positioning the cam with respect to a jig used for grinding the cam surfaces;

said cam surfaces being formed by grinding the front and rear surfaces into a convex shape while the cam is positioned on the jig by way of the positioner, each cam surface having an identical shape, the phases of their respective shapes being offset by 90 degrees from one another, each cam surface including:

a pair of maximum lift sections for positioning an associated piston head at its top dead center position in the cylinder bore, said maximum lift sections being separated from each other by 180 degrees; and a pair of minimum lift sections for positioning an associated piston head at the bottom dead center position in the cylinder bore, said minimum lift sections being separated from each other by 180 degrees, and wherein each maximum lift section is separated from each minimum lift section by 90 degrees;

said positioner being located halfway between one of the maximum lift sections and one of the minimum lift sections of the front cam surface and halfway between one of the maximum lift sections and one of the minimum lift sections of the rear cam surface, that is, said positioner being located at the same position on the front and rear surfaces of the cam with respect to their shapes.

10. The cam according to claim 9, wherein said cam has a shaft hole at the center thereof into which the drive shaft is inserted, and a boss is provided around the shaft hole protruding axially from the cam around the shaft hole.

11. The cam according to claim 10, wherein said positioner includes a hole formed at the boss and located apart from the shaft hole.

12. The cam according to claim 10, wherein said positioner includes a keyway formed in the shaft hole.

13. The cam according to claim 10, wherein said positioner includes a keyway formed in the outer edge of the cam.

14. A method for producing a cam having front and rear cam surfaces, said cam serving to drive a double-headed piston of a compressor through four complete strokes when the drive shaft makes one rotation, said method comprising the steps of:

preparing a jig having a support shaft and a positioning piece;

molding a primary product having front and rear sides, a shaft hole, and a positioner, said shaft hole being commonly used for receiving the drive shaft and the support shaft, said positioner being commonly used for engaging the positioning piece to form front and rear cam surfaces on the front and rear sides of the primary product, respectively;

mounting the primary product on the jig by inserting the support shaft into the support hole and by engaging the positioning piece with the positioner to place one of the sides in a position to face a grinder;

forming one cam surface in a convex shape by grinding the facing side of the primary product with the grinder;

repeating the mounting step after reversing the primary product so that the other side faces the grinder; and forming the other cam surface in a convex shape by grinding the facing side with the grinder.

15. The method according to claim 14, wherein said jig includes:

a swing shaft protruding from said jig and extending in a direction perpendicular to an axis of the support shaft;

and wherein said primary product and said jig pivots about the swing shaft in the forming steps.

* * * * *